United States Patent [19]

Aikoh et al.

[11] 4,237,552
[45] Dec. 2, 1980

[54] TIME DIVISION MULTIPLEXED TRANSMISSION SYSTEMS FOR TELEPHONE OR LIKE SIGNALS WITH FREQUENCY BAND COMPRESSION

[75] Inventors: Shinichi Aikoh; Kunihiko Niwa; Atsushi Tomozawa, all of Tokyo, Japan

[73] Assignee: Nippon Electric Co., Ltd., Tokyo, Japan

[21] Appl. No.: 51,291

[22] Filed: Jun. 22, 1979

[30] Foreign Application Priority Data

Jun. 22, 1978 [JP] Japan .................................. 53-76022

[51] Int. Cl.³ .............................................. H04J 3/16
[52] U.S. Cl. ......................................... 370/83; 370/7; 370/118
[58] Field of Search ................. 370/83, 79, 7, 84, 118, 370/81

[56] References Cited

U.S. PATENT DOCUMENTS

| | | | |
|---|---|---|---|
| 3,447,147 | 5/1969 | Deregnaucourt | 370/83 |
| 3,711,650 | 1/1973 | Kuhn et al. | 370/83 |
| 3,773,971 | 11/1973 | Sainte-Beuve | 370/83 |
| 4,002,841 | 1/1977 | Ching et al. | 370/81 |
| 4,005,274 | 1/1977 | Vagliani et al. | 370/118 |
| 4,012,595 | 3/1977 | Ota | 370/81 |
| 4,039,948 | 8/1977 | Boxall | 370/79 |
| 4,100,377 | 7/1978 | Flanagan | 370/81 |

*Primary Examiner*—Douglas W. Olms
*Attorney, Agent, or Firm*—Sughrue, Rothwell, Mion, Zinn and Macpeak

[57] ABSTRACT

In a digital time division multiplexed telephone transmission system, a plurality of telephone signals are cyclically sampled and quantized so that each sampled value may be encoded into a binary codeword of a preset number of bits and that a series of codewords equal in number to the telephone signals may constitute a frame and a series of a predetermined number frames may in turn constitute a superframe. At the transmission end, an input circuit (202) receives the time division multiplexed telephone signals, and a code converter (204) coupled to the input circuit and responsive to a state-representing signal successively converts each of the binary codewords into a plurality of modified codewords. The modified codewords are variably assigned comparatively smaller and greater numbers of binary digits depending on the state-representing signal, the comparatively greater number being equal to or smaller than the preset number. A selection circuit (207) is supplied with the modified codewords and selectively allows one of the modified codewords to pass. A bit-number-assigning circuit (205) is coupled to the code converter and responsive to the output of the selection circuit to produce the state-representing signal in response to the corresponding one of at least one preceding frame, and for each of the modified codewords, the bit-number-assigning circuit produces a bit-number-representing signal indicating the number of bits assigned to the binary codeword being transmitted. A multiplexer (206) is coupled to the bit-number-assigning circuit and arranges in time domain the output of the selection circuit, bit-number-representing signal and a superframe synchronization signal. At the reception end, a code-inverse converter (1003) is responsive to the bit-number-representing signal to reproduce the binary codewords from the modified codewords.

6 Claims, 13 Drawing Figures

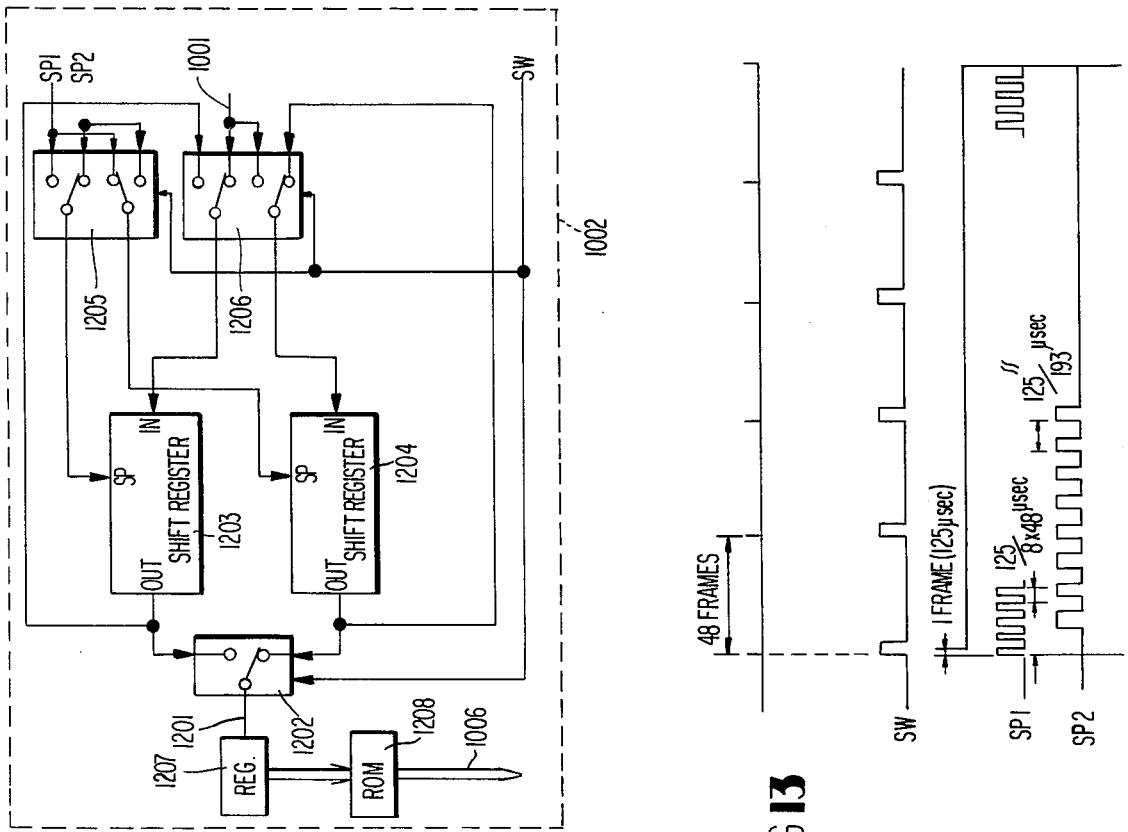
FIG 12
FIG 13
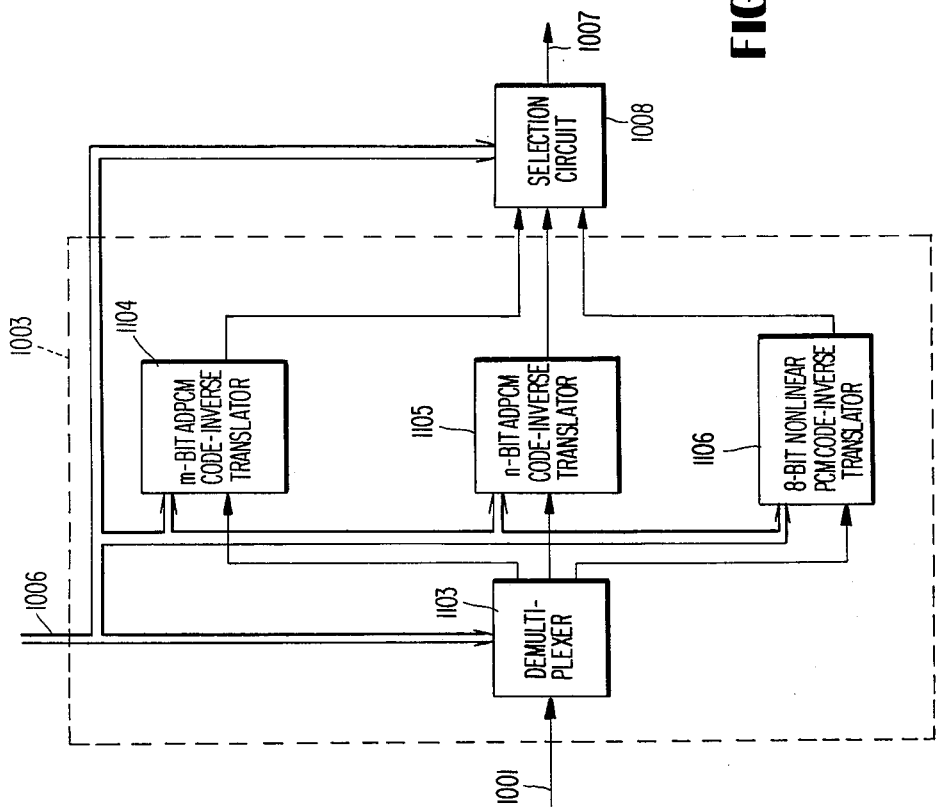
FIG 11

TIME DIVISION MULTIPLEXED TRANSMISSION SYSTEMS FOR TELEPHONE OR LIKE SIGNALS WITH FREQUENCY BAND COMPRESSION

BACKGROUND OF THE INVENTION

The present invention relates to a digital transmission system for time division multiplexed transmission of a plurality of digitized telephone signals or the like signals and, more particularly to a digital transmission system of this kind capable of frequency band compression with improved transmission performance.

Among various approaches to the frequency band compression for the multiplexed transmission of telephone signals, the so-called "time assignment speech interpolation (TASI) system" and, particularly "digital speech interpolation (DSI) system" have been in extensive use. Briefly stated, these conventional systems are based on the fact that an average telephone conversation has as much as 60 percent of speech inactivity time, in which the voice is absent. Instead of providing the transmission channels equal in number to the telephone signals to be transmitted, the conventional systems provide a much smaller number of channels, which are shared by the telephone signals in such a manner that one of the signals is inserted into the speech inactivity period of another. For details of the conventional systems, particularly of the DSI system, reference is made to U.S. Pat. No. 4,002,841 issued on Jan. 11, 1977 to Bell Telephone Laboratories Inc., and a paper titled "Ditigal Speech Interpolation" by S. J. Campanella, published in *COMSAT Technical Review*, Vol. 6, No. 1 (Spring issue, 1976), pp 127–158.

For the above outlined conventional systems to achieve the desired results, the presence and absence of the speech signal must be determined on each of the incoming signal paths. This is usually performed by a speech detector, which determines the presence of the signals with respect to a reference significant signal level. However, a slight time lag is unavoidably involved in the speech signal detection at the speech detector, resulting in the mutilation of conversation or speech clipping at the start of each segment of the speech signal. In order to overcome this problem, the conventional DSI system employs, for each of the signal paths, a delay circuit which brings the incoming signal into synchronism with the speech detector output. If the signal becomes out of coincidence with the detector output due to additional delay caused by long transmission paths, the talker's echo disturbs the conversation. Need arises accordingly for echo suppressors or cancellers, increasing the cost per transmission channel. This difficulty will be seen from the description given in U.S. Pat. No. 4,059,730 issued on Nov. 22, 1977 to Bell Telephone Laboratories, Inc. and U.S. Pat. No. 3,644,680 issued on Feb. 22, 1972 to Fujitsu Limited. The same problem applies to the transmission of other similar digital signals of comparable frequency bandwidth involving inactivity time periods.

SUMMARY OF THE INVENTION

It is therefore an object of the present invention to provide a novel time division multiplexed transmission system for a plurality of telephone and like signals capable of achieving frequency band compression to a degree comparable to the conventional DSI system while eliminating the possibility of causing a talker's echo.

According to the present invention, there is provided a digital transmission system for efficient transmission of time division multiplexed digital telephone signals, wherein a plurality of telephone signals are cyclically sampled and quantized so that each sampled value may be encoded into a binary codeword of a preset number of bits and that a series of said codewords equal in number to said telephone signals may constitute a frame defined by a frame synchronization signal and a series of a predetermined number of said frames may in turn constitute a superframe defined by a superframe synchronization signal, thereby providing said time division multiplexed digital telephone signals, wherein said system comprises:

input means for receiving said time division multiplexed telephone signals, means coupled to said input means in parallel and responsive to a state-representing signal for successively conventing each of said binary codewords into a plurality of modified codewords, said modified codewords being variably assigned comparatively smaller and greater numbers of binary digits depending on said state-representing signal, said comparatively greater number being equal to or smaller than said present number;

selection means supplied in parallel with said modified codewords for selectively allowing in response to said state-representing signal one of said modified codewords to pass therethrough for each said binary codewords, means coupled to said converting means and responsive to the output of said selection means for producing said state-representing signal in response to the corresponding one of at least one preceding frame, and for producing, for each said modified codewords, a bit-number-representing signal indicating the number of binary digits assigned to the binary codeword being transmitted;

means coupled to said state-representing signal producing means for arranging in time domain the output of said selection means, bit-number-representing signal and said superframe synchronization signal, so that said time division multiplexed digital signals with said modified codewords are provided; and means for generating timing pulses for controlling the operation of all the frequency means;

wherein said system comprises at the reception end input means for receiving said time division multiplexed digital signals with said modified codewords; means responsive to said bit-number-representing signal for reproducing said binary codewords respectively from said modified codewords, thereby reproducing said time division multiplexed digital signals of unmodified codewords suited for ordinary decoding.

Thus, the present invention achieves the frequency band compression by shortening the total length of each of the signal frames of those digitized samples.

BRIEF DESCRIPTION OF THE DRAWINGS

The specification, when taken in conjunction with the accompanying drawings disclose preferred embodiments of the invention. In the drawings, like reference numerals identify identical structural elements, and:

FIG. 11 shows one example of a decoder shown in FIG. 10;

FIG. 12 illustrates one example of a bit-number-extraction circuit shown in FIG. 10; and FIG. 13 is a timing chart of control signals for the circuit of FIG. 12.

DETAILED DESCRIPTION OF THE INVENTION

In the entire drawings, signal paths and signals may sometimes be referred to without distinguishing one from the other. Also, while it is assumed throughout the description that the information signals to be transmitted are telephone signals, it should be noted that the same description applies to other signals of comparable frequency bandwidth and nature.

Figure 1:
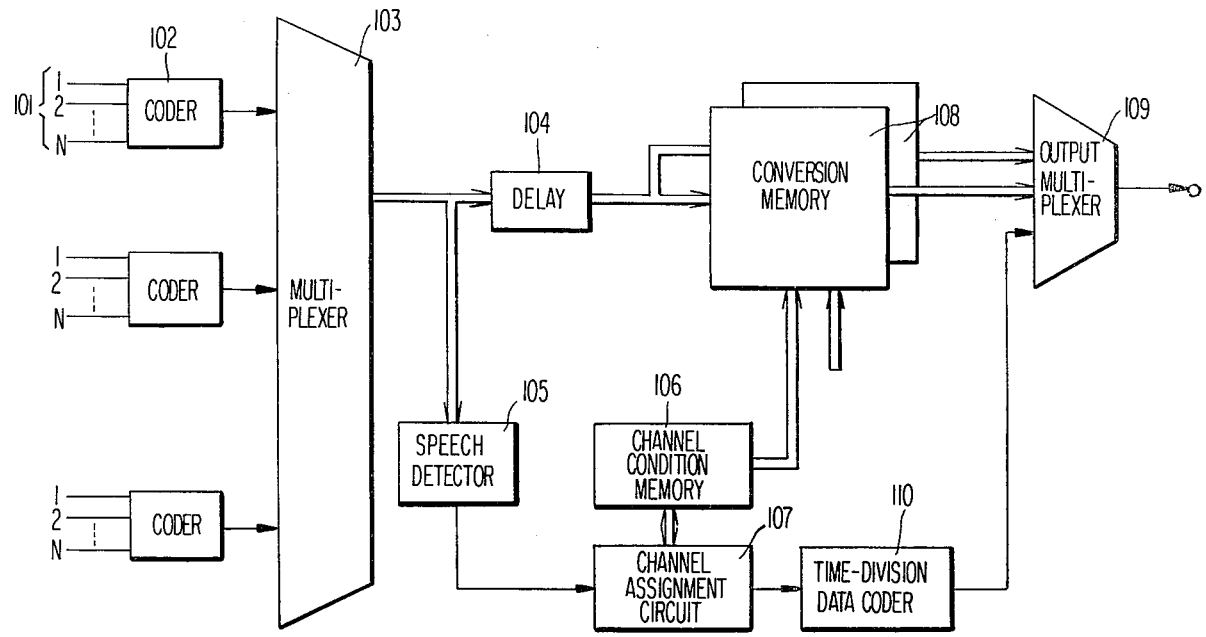
FIG. 1 is a block diagram of a transmitter for use in a conventional DSI system.

FIG. 1 illustrates an example of the conventional DSI transmitter. A DSI receiver is not illustrated here because its composition inversely corresponds to that of the transmitter. Each of coders 102 encodes (samples of) N-channel input telephone signals into a series of pulse code modulated (PCM) codewords. The PCM codewords, after being time-division-multiplexed by an input multiplexer 103, are supplied to a delay circuit 104 and a speech detector 105. The delay circuit 104, after delaying by a certain length of time the multiplexed PCM codewords supplied from the input multiplexer 103, feeds them to a conversion memory 108. The speech detector 105 determines, on each channel, whether or not said multiplexed PCM codewords given thereto are significant telephone signals, and supplies each of the results of determination to a channel assignment circuit 107, which, in response to the output of the speech detector 105, assigns channels and feeds the assignment information to a channel condition memory 106. In the memory 106 is stored the channel assignment information. Depending on the output from the memory 106, each telephone signal of the channels to be transmitted from the conversion memory 108 is supplied to an output multiplexer 109, multiplexed with the channel assignment information fed from a time-division data coder 110 for transmission.

As discussed above, the conventional DSI system, in which detected telephone signals are transmitted only after being delayed by the delay circuit 104, is vulnerable to the above-mentioned talker's echo because of this delay time.

Figure 2:
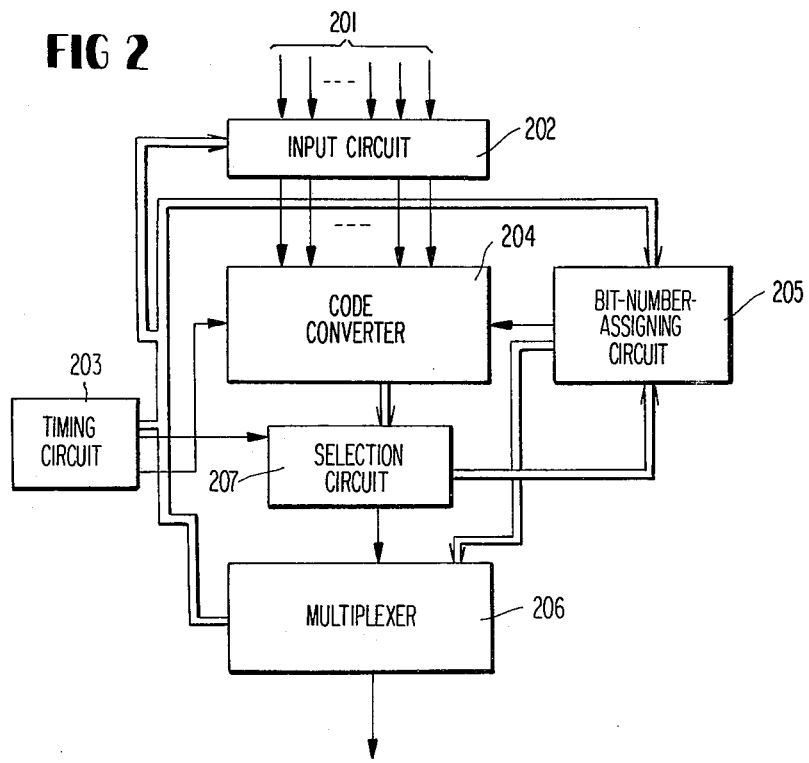
FIG. 2 is a schematic block diagram illustrative of a transmitter for use in one embodiment of this invention.

Referring to FIG. 2 which illustrates the transmitter for use in one embodiment of the present invention, an input circuit 202 corresponds to the coders 102 in FIG. 1; a bit-number-assigning circuit 205 to the channel condition memory 106, channel assignment circuit 107, and data coder 110; and a multiplexer 206 to the conversion memory 108 and multiplexer 109 in FIG. 1. It should be noted that the multiplexer 103, delay circuit 104, and speech detector 105 in FIG. 1 are not employed in FIG. 2.

In FIG. 2, input telephone signals 201 from multiple channels are given to the input circuit 202. Although either analog or digital telephone signals are assumed as the input signals 201, description hereunder will refer to the example where nonlinear PCM-encoded digital signals are used. If the input telephone signals 201 are analog signals, well-know PCM coders must be employed in the input circuit 202 to perform the nonlinear PCM coding of the input signals 201. The input circuit 202 performs the nonlinear to linear conversion of the input signals 201, and supplies them to a code converter 204. To the converter 204 are given digital signals of all the channels supplied from the input circuit 202, and each of these digital signals is subjected to high-efficiency code conversion such as adaptive differential PCM (ADPCM) code conversion with one bit or a greater variable number of bits based on code-converting-bit-number information (hereunder referred to as "CCBN information") supplied from the bit-number-assigning circuit 205. For details of the ADPCM code conversion technique to give modified codewords, reference is made to a paper entitled "Adaptive Quantization in Differential PCM Coding of Speech", by P. Cummiskey et al., published in *The Bell System Technical Journal* (September issue, 1973), pp. 1105-1118. To the multiplexer 206 are given the output of the converter 204 through a selection circuit 207 and the CCBN information of each channel supplied from the circuit 205, and these signals are multiplexed for transmission (the frame format in FIG. 5 to be referred to hereunder). The circuit 205 produces the CCBN information to code-convert the subsequent input telephone signal by the use of a predetermined method depending on the output of the converter 204 so that said CCBN information may be given to the converter 204 and multiplexer 206. A timing circuit 203 supplies each of said circuits 202, 204, 205, 206 and 207 with needed timing signals.

In this manner, each telephone signal of the multiple channels is continuously code-converted with one bit or a greater variable number of bits and transmitted, causing no speech clipping, transmission delay, or echoes. Consequently, neither an echo canceller nor an echo suppressor is required in the present system, resulting in a reduction in the cost per channel. Besides, the use of the high-efficiency code conversion technique for the above-mentioned code conversion purpose permits the present system to achieve band compression to approximately the same extent comparable to the DSI system.

Figure 3:
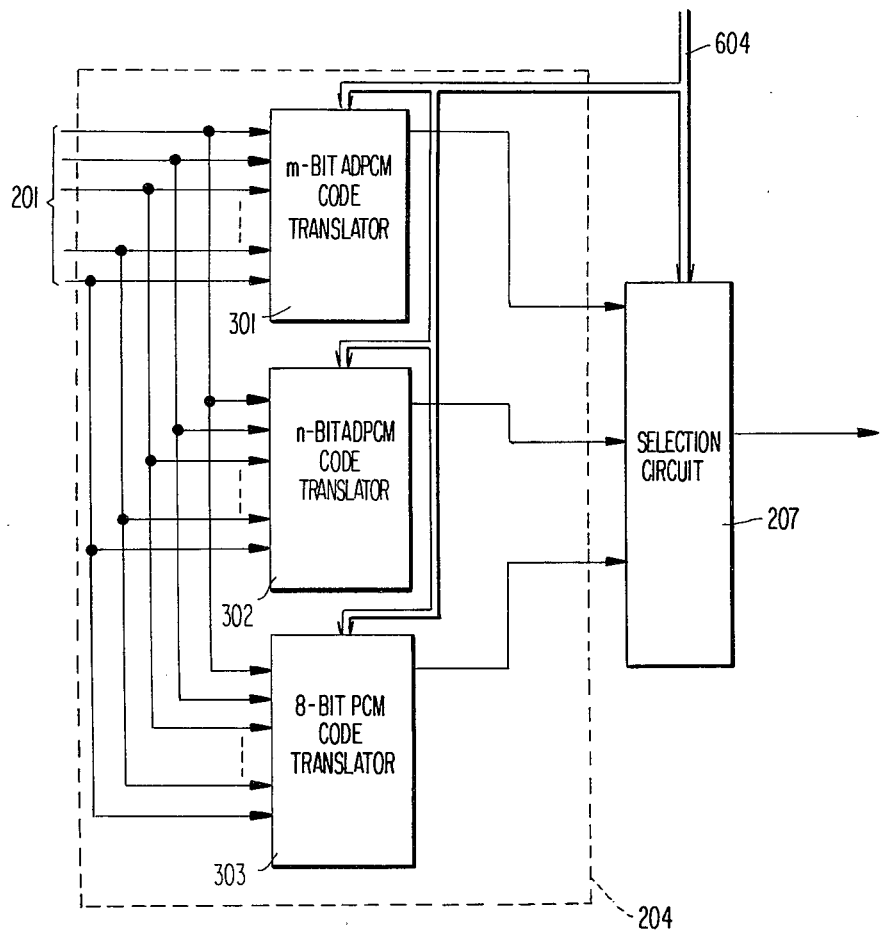
FIG. 3 is a block diagram of the coder shown in FIG. 2.

Referring to FIG. 3, the combination of an m-bit and an n-bit ADPCM code translators and an eight-bit PCM code translator are employed as the converter 204.

The input telephone signals 201 are given to the m-bit ADPCM code translator 301, n-bit ADPCM code translator 302, and eight-bit PCM code translator 303. To each one of the translators 301, 302 and 303 is supplied CCBN information 604, which is the output of the bit-number-assigning circuit 205 shown in FIG. 2 to designate one of the translators 301, 302 and 303, and said signals 201 are code converted by this designated translator and supplied to a selection circuit 207. The circuit 207 responsive to said information 604 selects and passes on the output of the designated translator. If m and n range from one to seven and m is smaller than n, signals of a channel whose input signal level is lower undergo code conversion by the code translator 301 to become the output of the converter 204, and depending on the increase of the signal level, the translators 302 and 303 are used in this order in place of the translator 301.

Figure 4:
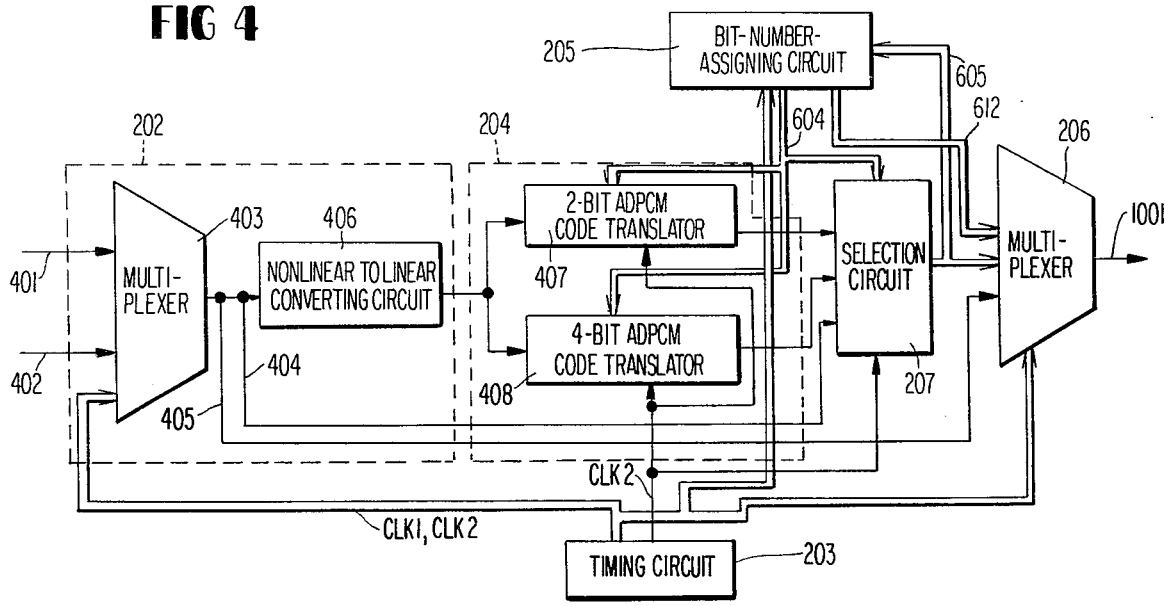
FIG. 4 illustrates in detail the transmitter shown in FIG. 2.

With reference to FIG. 4, two sequences of time-division-multiplexed digital signals 401 and 402 from two 24-channel PCM systems, which are derived by subjecting each of 24-channel telephone signals to eight-bit-nonlinear PCM encoding, are supplied as inputs to the shown transmitter using the code converter 204. Thus encoded nonlinear PCM codeword 404 is code-converted using either a two-bit ADPCM code translator 407 or a four-bit ADPCM code translator 408. Otherwise, said codeword 404 is directly given to the selection circuit 207. More specifically, the digital signals 401 and 402 multiplexed by an input multiplexer 403 are fed to the selection circuit 207 and nonlinear to linear converting circuit 406. To the converting circuit 406 are given 48-channel multiplexed PCM signals from the input multiplexer 403 to be converted into 13-bit linear codewords and supplied to the translators 407 and 408, which give modified codewords. A 13-bit linear codeword sent to the translators 407 and 408 is code-converted by either one of said code translators 407 and 408 based on CCBN information supplied from a bit-number-assigning circuit 205, and fed to the selection circuit 207. In this operation, control is so effected as to inactivate the code translator not used for code conversion. The code converter 204 in FIG. 4 may be composed of only one code translator to produce a variable number of code-converting bits. The result of code conversion of 13-bit linear codeword by said translator 407 or 408 and the nonlinear PCM codeword 404 are fed to the selection circuit 207, and one of these is selected based on said CCBN information supplied from the circuit 205 and fed to an output multiplexer 206. The output of the circuit 207, the CCBN information which is the output of the circuit 205, and 48-channel signalling information 405 from the input multiplexer 403 are given to the output multiplexer 206, time-division-multiplexed therein and supplied as the output thereof. A timing circuit 203 supplies each of said circuits with needed timing signals.

Since each input telephone signal of the channels is continuously code-converted with a varied number of bits (two, four or eight), no speech clipping or mutilation of telephone conversation occurs even when the number of code-converting bits is switched from one to another. Furthermore, appropriate changing of the number of code-converting bits makes possible band compression to the extent comparable to the conventional DSI system.

While the ADPCM code translators are used as the converter 204 in the transmitter of FIG. 4, the converter 204 can alternatively be constituted by an NIC (nearly instantaneous companding) code translator or the combination of ADPCM translator and an NIC code translator. Code conversion by nearly instantaneous companding is described in a paper entitled "Nearly Instantaneous Companding for Nonuniformly Quantized PCM" by L. Duttweiller and David G. Messerschmitt, published in *IEEE Transactions on Communications,* Vol. COM-24, No. 8, (August issue, 1976), pp. 864-873. The use of this technique permits both the reduction of the bit rate through block-by-block processing of the sample values of telephone signals and the simplification of hardware.

Figure 5:
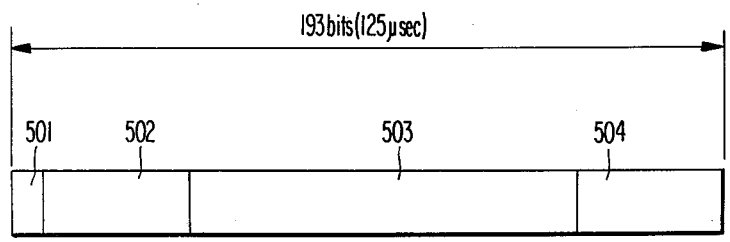
FIG. 5 illustrates a typical frame format of the output signal of the transmitter shown in FIG. 4.

An example of the frame format of the output of the output multiplexer 206 is illustrated in FIG. 5, wherein reference numeral 501 refers to a framing bit for frame synchronization, and reference numeral 502, to CCBN information represented in eight bits. The latter is used for conveying the CCBN information (as to which of the three modes, eight-bit nonlinear PCM code conversion, four-bit ADPCM code conversion and two-bit ADPCM code conversion, is to be used) for one channel per frame. Reference numeral 503 refers to 48-channel input signals code-converted with the number of bits assigned for each channel and time-division-multiplexed, which consists of 176 bits. Reference numeral 504 refers to eight signalling bits used for conveying signalling information for eight channels per frame, i.e., 48-channel signalling information in six frames. In this embodiment illustrated in FIG. 4, the CCBN information is sequentially conveyed at a rate of one channel per frame. In this manner, it is possible to convey the CCBN information for each channel in a fixed period corresponding to 48 frames, i.e., a superframe. More in detail, the 176-bit section 503 in the first frame of the superframe is used as new CCBN information for all the 48-channels in the next superframe. Also, since there is no need to convey channel numbers because of the sequential conveying procedure, the number of bits can be reduced. Alternatively, instead of conveying the CCBN information for every channel, it is also possible to detect channels to which different numbers of bits from those previously assigned are allocated and to multiplex the numbers of these channels and new CCBN information in the segment indicated by reference numeral 502 in FIG. 5. In this instance, because the new CCBN information is immediately conveyed for any channel undergoing a change in number of code-converting bits, the alteration of the number of code-converting bits can be accomplished in a short period of time.

In this embodiment, because the segment represented by reference numeral 503 consists of 176 bits, the result of code-converting and time-division-multiplexing of 48-channel input signals should also be comprised of 176 bits. Hence, the combinations of the numbers of channels to undergo code conversion in the three modes, i.e, two-bit ADPCM code conversion, four-bit ADPCM code conversion, and eight-bit nonlinear PCM code conversion, are limited to those listed in Table 1.

TABLE 1

| Number of channels for 8-bit nonlinear PCM code conversion | Number of channels for 4-bit ADPCM code conversion | Number of channels for 2-bit ADPCM code conversion |
| --- | --- | --- |
| 0 | 40 | 8 |
| 1 | 37 | 10 |
| 2 | 34 | 12 |
| 3 | 31 | 14 |
| 4 | 28 | 16 |
| 5 | 25 | 18 |
| 6 | 22 | 20 |
| 7 | 19 | 22 |
| 8 | 16 | 24 |
| 9 | 13 | 26 |
| 10 | 10 | 28 |
| 11 | 7 | 30 |
| 12 | 4 | 32 |
| 13 | 1 | 34 |

As shown in Table 1, 14 combinations of the three-code conversion modes can be taken. Therefore, when said input signals of said plural channels are code-converted by the code-translators, the most suitable combination for code-converting every one of the 48 channels has to be selected, and what achieves this selection is the bit-number-assigning circuit 205. Alternatively, instead of assigning the number of bits in the 14 combinations listed in Table 1, it is also possible to assign the number of bits in only a fixed one of the 14 combinations.

Figure 6:
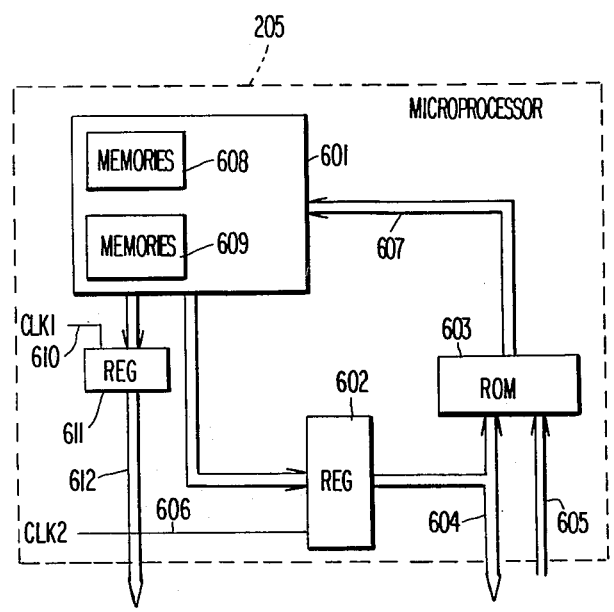
FIG. 6 illustrates one example of a bit-number-assigning circuit in FIG. 4.

FIG. 6 illustrates in detail the bit-number-assigning circuit 205 of FIG. 4. Reference numeral 604 is CCBN information supplied from the circuit 205, and the result of code conversion of input signals of input channels by the code converter 204 based on the CCBN information is represented by reference numeral 605. An ROM (read only memory) 603 is addressed by the information 604 and the output 605 of the converter 204, and the number of bits (represented by reference numeral 607) needed for code conversion of the subsequent input speech signal is fed to a microprocessor 601. All these actions take place individually on every input channel. The microprocessor 601, on the basis of the number of bits required for the subsequent input signal on each channel supplied from the ROM 603, renews the assignment of bit number using Table 1, supplies this information to a register 611, and at the same time stores it in a memory 608 (609).

The renewal of the bit number assignment is accomplished in the following manner: First, by finding out the number of bits required on each of 48 channels for code conversion of the subsequent input signal of each channel supplied from the ROM 603, the number of channels, out of the 48 channels, which need eight-bit and four-bit code conversion, is known. Next, by using Table 1, such a combination that makes the sum of the number of channels for eight-bit nonlinear PCM code conversion and that of channels for four-bit ADPCM code conversion either equal to or greater by one than said number of channels is selected. If the number of channels which need eight-bit or four-bit code conversion is 13 or smaller, however, the combination in which the number of channels for the eight-bit nonlinear PCM code conversion is 13 is selected from Table 1, and if it is 41 or greater, the combination in which the number of channels for the eight-bit nonlinear PCM code conversion is 0 is used. Also, within the range of the number of channels permitted by the combinations so selected, a new number of bits needed on each channel is assigned depending on the order of priority given in advance to the 48 channels. Accordingly, a channel or channels ranked low in the order of priority may fail to be assigned the needed number or numbers of channels. This order of priority, however, is renewed each time so that it may favor no particular channel or channels. Supposing, for instance, the first 10 of the 48 channels require eight-bit-code conversion, the 11th through 25th require four-bit code conversion and the remaining 23 channels require two-bit coding, the combination in which the number of channels for the eight-bit nonlinear PCM code conversion is seven will be chosen from Table 1. If, further, the order of priority then is so set that priority successively decreases from the first to 48th channel, eight bits will be assigned to each of the first seven channels, four bits to each of the eighth through 26th and two bits to each of the remaining 22. Although the eighth through 10th channels will therefore fail to be assigned the eight bits each they require and instead be assigned only four bits each, such state will last only for a brief period of time because the order of priority is renewed every 48 frames, and accordingly will pose no practical problem. Bit number assignment in this manner is achieved using a program built in the microprocessor 601, but its details will be omitted here.

In response to a clock signal 610, new CCBN information 612 for the next step of code-converting on each channel is supplied from the register 611 to the output multiplexer. The information 612 corresponds to reference numeral 502 in FIG. 5. To transmit the new CCBN information for some input channel, the superframe of 48 unit frames equal to the total number of input channels are needed, and code conversion among said superframe is accomplished with the same number of code-converting bits, which is supplied from the memory 609(608). In response to a clock signal 606, CCBN information required for code-converting of each of the 48 channels is repeatedly read out from one frame to another in a register 602, and further supplied to the converter 204 and ROM 603. As soon as said information is read out on a one-channel-per-frame basis after the new CCBN information for the 48 channels has been written into the memory 608(609), and as soon as the information for all the 48 channels has been transmitted with the bits represented by reference numeral 502 by the use of the superframe, the function performed by the memory 609(608) up to that time point is performed by the memory 608(609) and vice versa.

Figure 7:
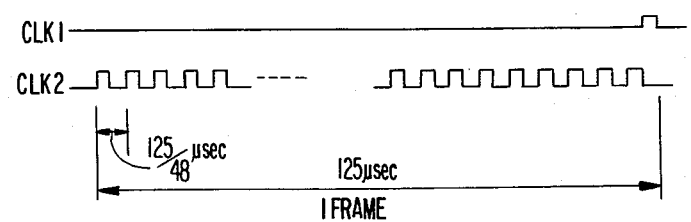
FIG. 7 is a timing chart of clock signals referred to in FIG. 6.

FIG. 7 illustrates the clock signals 610 (CLK1) and 606 (CLK2) in FIG. 6, both supplied from the timing circuit 203 in FIG. 4. The CLK1 gives one timing pulse per unit frame to convey the next CCBN information to the output multiplexer as stated above. The CLK2 gives timing pulses to convey to the code converter 204 the CCBN information 604 needed for code conversion of the 48 channels in each frame.

Figure 8:
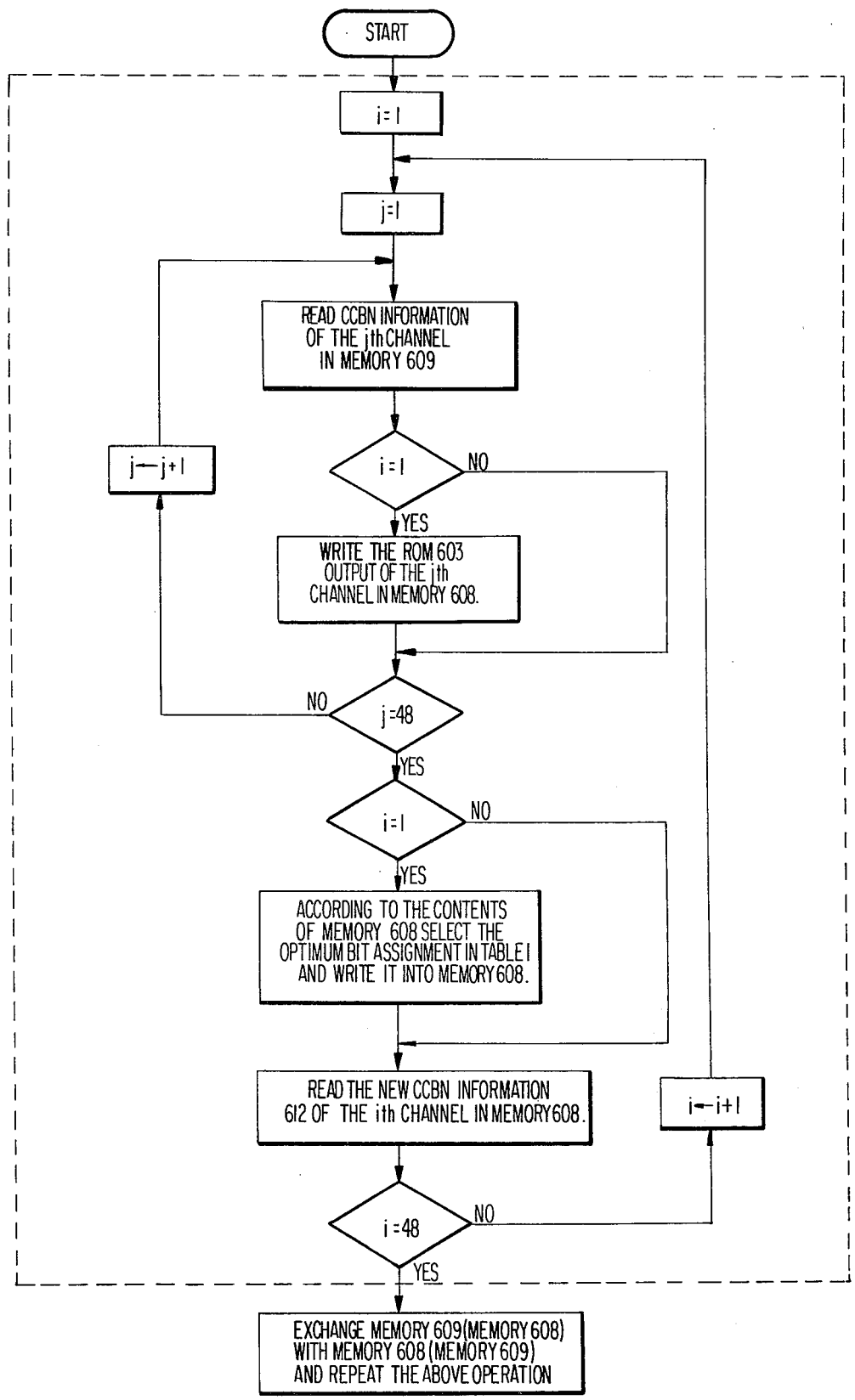
FIG. 8 is a flow chart of the operation of a microprocessor in FIG. 6.

FIG. 8 is a flow chart indicating the operation of the microprocessor in FIG. 6, which may be composed of the type disclosed in *Advanced Micro Devices: The Am2900 Family Data Book,* Advanced Micro Devices, Inc., 1976, pp. 5–16.

Referring to FIG. 8, in the part of this flow chart enclosed by dotted lines, a memory 609 produces 48-channel CCBN information in each frame of the superframe discussed referring to FIG. 5, and a memory 608 memorizes new CCBN information for each channel, in other words, all the information stored in the memory 608 is written into where i=1, i.e., during the first unit frame of said superframe, and read out where i=48, i.e., during the superframe. From the memory 609 is repeatedly read out every frame of the superframe the CCBN information from j=1, i.e., the first channel, to j=48, i.e., the 48th channel.

Figure 9:
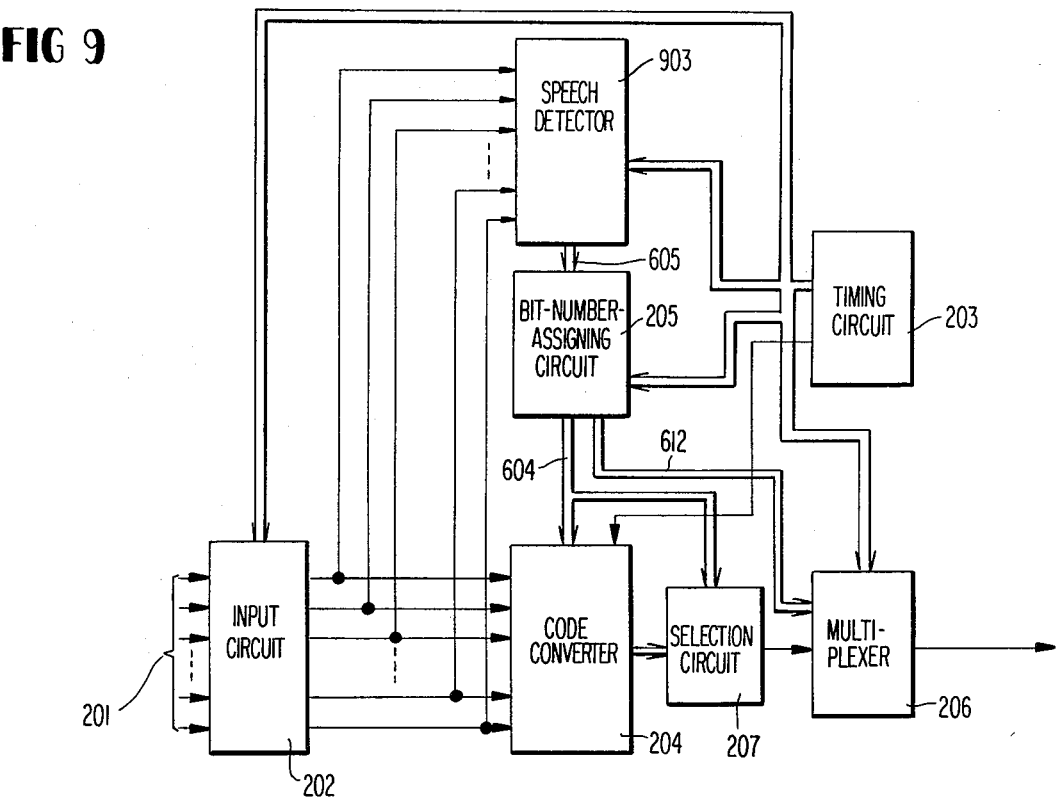
FIG. 9 is a block diagram of the transmitter to be used in a second embodiment of the present invention.

Referring to FIG. 9, which illustrates a second example of transmitter, a detector 903 is additionally provided as compared to the example shown in FIG. 2. The detector 903 can be composed of a speech detector of known type described in FIG. 1 of U.S. Pat. No. 4,001,505. In this second example, the level of each input signal is monitored. Each input signal of the plural channels, fed from the input circuit 202 are given to the detector 903, where the signal level of each channel is determined, and the resultant information is supplied to a bit-number-assigning circuit 205. Supposing the signal represented by reference numeral 605 in FIG. 6 is an output signal from said detector 903, this transmitter operates as described above with reference to FIGS. 6, 7 and 8. The action of every subsequent circuit is the same and gives the same effect as what was described with reference to FIG. 2.

Figure 10:
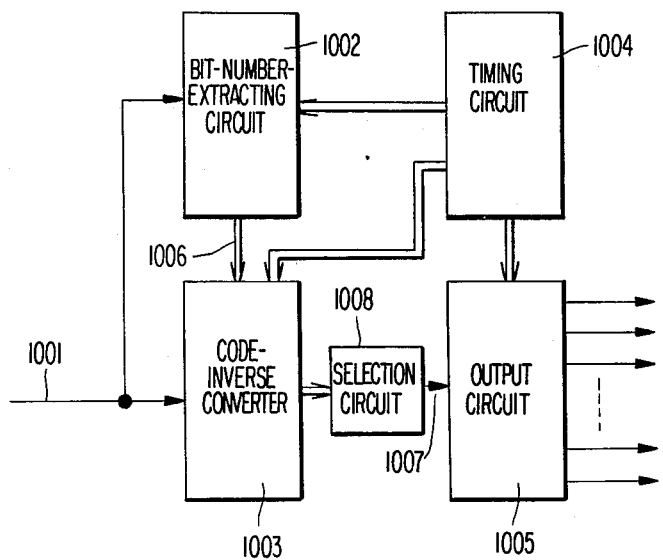
FIG. 10 is a block diagram of a receiver for use in this invention.

Referring to FIG. 10, which illustrates the receiver for use in this invention, the output of the transmitter of FIG. 2 or FIG. 9 is given as input signals 1001 to a bit-number-extracting circuit 1002 and code-inverse converter 1003. The frame format of the input signals 1001 may be, for instance, like the one illustrated in FIG. 5. The circuit 1002 extracts from the input signals 1001 CCBN information to indicate the number of bits with which the input telephone signal of each channel has been code-converted, and feeds this information to the converter 1003. The input signals 1001 are given to the converter 1003, inversely code-converted based on the CCBN information 1006 for each channel supplied from the bit-number-extracting circuit 1002, and fed through a selection circuit 1008 to an output circuit 1005 having a linear to nonlinear converting circuit and a demultiplexer (both not shown). The output circuit 1005 converts the output 1007 of the converter 1003 into the original form of the telephone signal of each channel. A timing circuit 1004 supplies said circuit 1002, inverse-code converter 1003 and output circuit 1005 with needed timing signals.

FIG. 11 illustrates an example of the inverse-code converter 1003 in FIG. 10, which corresponds to the code converter 204 in FIG. 3. The sequence of bits, which is derived by multiplexing multi-channel telephone signals fed from the code converter 204, is given to a demultiplexer 1103 as indicated by reference numeral 1001. Based on the CCBN information 1006 indicating the number of bits with which the input telephone signal of each channel supplied from the circuit 1002 has been code-converted, the demultiplexer 1103 supplies said bit sequence to one of three code-inverse translators, i.e., an m-bit ADPCM code-inverse translator 1104, n-bit ADPCM code-inverse translator 1105 and eight-bit nonlinear PCM code-inverse translator 1106. Said information 1006 further so functions as to activate the particular one of said three translators 1104, 1105 and 1106, to which said demultiplexer 1103 has supplied said bit sequence and to keep the remaining for translators inactive. The activated code-inverse translator decodes the bit sequence given and feeds it to the selection circuit 1008, which selects the output of the translator designated by said information 1006, and supplies it to the output circuit 1005.

Referring to FIG. 12, the bit-number-extracting circuit 1002 in FIG. 10 supplies the inverse-code converter 1003 with the CCBN information 1006, which is needed for inversely code-converting 48-channel telephone signals in each frame, and at the same time extract from the given sequence of input bits new CCBN information for each channel as represented by reference numeral 502 in the frame format of FIG. 5. As explained in connection with the bit-number-assigning circuit 410 illustrated in FIG. 6, to transmit new CCBN information for 48 channels by the use of the segment represented by said reference numeral 502, 48 frames are required.

Said information for every frame is stored in a shift register 1203 (shift register 1204). Until the new CCBN information for 48 channels has been stored in this shift register 1203 (shift register 1204), the present CCBN information for 48 channels in each frame is repeatedly supplied from the shift register 1204 (shift register 1203). These actions of the shift registers 1203 and 1204 are alternated between them at every 48th frame.

Each of switch circuits 1202, 1205 and 1206 is switched by a switching pulse SW. Reference letters SPs represent shift pulse input terminals for two kinds of shift pulses SP1 and SP2. A timing chart of these pulses SW, SP1 and SP2 are given as shown in FIG. 13. Supposing now the bit-number-extracting circuit 1002 is in such a switching state as illustrated in FIG. 12, the input bit sequence (193 bits/frame) will be given to the shift register 1203 through the signal path 1001, and eight bits of CCBN information for one channel per frame are written into the shift register 1203 by the pulse SP2 shown in FIG. 13. Into the shift register 1204 is rewritten its own output in a feedback process by the pulse SP1 of FIG. 13, and at the same time this output 1201 is serial-parallel converted by a register 1207 and given to an ROM 1208 as the CCBN information for each channel, which is subjected to error correction and is supplied to the code-inverse converter. In this manner, new CCBN information for 48 channels is given to the shift register 1203, and the shift register 1204 repeatedly supplies decoding-bit-number-information for 48-channels in each frame to the inverse-code converter 1003. After 48 frames have been processed, each switch circuit in FIG. 12 is switched from one state to the other one by the switching pulse SW, so that said functions of the shift registers 1203 and 1204 may be exchanged between them. In this way, CCBN information for each channel is supplied from the bit-number-extracting circuit, so that the given sequence of input bits may be decoded by the converter 1003. It should be noted that since the CCBN information for each channel can be known at regular intervals (48 frames) and is conveyed in the order of channel numbers, there is no need for channel number information, and accordingly a smaller number of bits are required. Moreover, the bit-number-extracting circuit 1002 may be composed such that it extracts CCBN information indicating the number of bits with which the input telephone signal of each channel has been code-converted. This circuit would have a structure that gives said information to the code-inverse converter 1003, detects among plural channels any channel for which the output of the bit-number-assigning circuit differs from the output of said bit-number-assigning circuit for the same channel, and time-division-multiplexes in one frame the channel number of said channel and the output of the bit-number-assigning circuit for this channel together with the output of the code converter 204 for said plural channels. In this instance, it is possible to immediately know new CCBN information for any channel undergoing a change in code-converting bit numbers and the number of bits for inversely code-converting the telephone signal of said channel can be altered in a shorter period of time.

Also, although in the foregoing description, detailed structure of the input circuit 202 of FIG. 4 and the output circuit 1005 of FIG. 10 was not given, the non-linear to linear converting circuit 406 of the circuit 202 and the linear to non-linear converting circuit (not shown) of the circuit 1005 may be respectively composed of the types disclosed in FIG. 15 and FIG. 16 of a paper entitled "A Unified Formulation of Segment Companding Laws and Synthesis of Codes and Digital Compandors", by H. Kaneko, published in *The Bell System Technical Journal,* (September issue, 1970), pp. 1555–1587.

Similarly, the selection circuits 207 and 1008 may be composed of the type disclosed on page 232 of *Signetics Logic—TTL DATA MANUAL*, published in May, 1978 by Signetics Corporation.

As has been mentioned above, the present invention provides a very useful transmission system compared with the conventional systems. Although various aspects of the present invention have been described and illustrated in detail, by way of example with respect to the transmission system, it is to be understood that the same is not by way of limitation. Particularly, as stated above, the input signals given to the transmitter are not limited to telephone signals, and they may be data signals from MODEM.

What is claimed is:

1. A digital transmission system for efficient transmission of time division multiplexed digital telephone signals, wherein a plurality of telephone signals are cyclically sampled and quantized so that each sampled value may be encoded into a binary codeword of a preset number of bits and that a series of said codewords equal in number to said telephone signals may constitute a frame defined by a frame synchronization signal and a series of a predetermined number of said frames may in turn constitute a superframe defined by a superframe synchronization signal, thereby to provide said time division multiplexed digital telephone signals, wherein said system comprises at the transmission end:

input means for receiving said time division multiplexed telephone signals;

means coupled to said input means in parallel and responsive to a state-representing signal for successively converting each said binary codewords into a plurality of modified codewords, said modified codewords being variably assigned comparatively smaller and greater numbers of binary digits depending on said state-representing signal, said comparatively greater number being equal to or smaller than said preset numbers; selection means supplied in parallel with said modified codewords for selectively allowing in response to said state-representing signal one of said modified codewords to pass therethrough for each said binary codewords;

means coupled to said converting means and responsive to the output of said selection means for producing said state-representing signal in response to the corresponding one of at least one preceding frame, and for producing, for each said modified codewords, a bit-number-representing signal indicating the number of binary digits assigned to the binary codeword being transmitted;

means coupled to said state-representing signal producing means for arranging a time domain the output of said selection means, bit-number-representing signal and said superframe synchronization signal, so that said time division multiplexed digital signals with said modified codewords are provided; and means for generating timing pulses for controlling the operation of all the foregoing means; and wherein said system comprises at the reception end:

input means for receiving said time division multiplexed digital signals with said modified codewords;

means responsive to said bit-number-representing signal for reproducing said binary codewords respectively from said modified codewords, thereby reproducing said time division multiplexed digital signals of unmodified codewords suited for ordinary decoding.

2. A digital transmission system for efficient transmission of time division multiplexed digital telephone signals, wherein a plurality of telephone signals are cyclically sampled and quantized so that each sampled value may be encoded into a binary codeword of a preset number of bits and that a series of said codewords equal in number to said telephone signals may constitute a frame defined by a frame synchronization signal and a series of a predetermined number of said frames signal may in turn constitute a superframe defined by a superframe synchronization signal, thereby to provide said time division multiplexed telephone signals, wherein said system comprises:

input means for receiving said time division multiplexed telephone signals;

means coupled to said input means in parallel and responsive to a state-representing signal for successively converting each said binary codewords into a plurality of modified codewords, said modified codewords being variably assigned comparatively smaller and greater numbers of binary digits depending on said state-representing signal, said comparatively greater number being equal to or smaller than said preset number;

selection means supplied in parallel with said modified codewords for selectively allowing in response to said state-representing signal one of said modified codewords to pass therethrough for each said binary codewords;

means responsive to the output of said input means for detecting the level of each said digital telephone signals for each said codewords; means for producing said state-representing signal in response to the level detected by said detecting means, and for producing, for each said modified codewords, a bit-number-representing signal indicating the number of binary digits assigned to the binary codeword being transmitted;

means coupled to said state-representing signal producing means for arranging in time domain the output of said selection means, bit-number-representing signal and said superframe synchronization signal, so that said time division multiplexed digital signals with said modified codewords are provided; and means for generating timing pulses for controlling the operation of all the foregoing means; and wherein said system comprises at the reception end:

input means for receiving said time division multiplexed digital signals with said modified codewords;

means responsive to said bit-number-representing signal for reproducing said binary codewords respectively from said modified codewords, thereby to reproduce said time division multiplexed digital signals of unmodified codewords suited for decoding.

3. A digital transmission system as claimed in claim 1 or 2, wherein said converting means comprises adaptive differential PCM code translators.

4. A digital transmission system as claimed in claim 1 or 2, wherein said converting means comprises nearly instantaneous companding (NIC) code translators.

5. A digital transmission system as claimed in claim 1 or 2, wherein said converting means comprises the combination of a nonlinear PCM code translator and adaptive differential PCM code translators.

6. A digital transmission system as claimed in claim 1 or 2, wherein said converting means comprises the combination of adaptive PCM code translators and NIC code translators.

* * * * *